Oct. 27, 1964  H. W. ROCKWELL  3,154,160
LOAD INDICATOR FOR MATERIAL HANDLING VEHICLE
Filed June 14, 1962
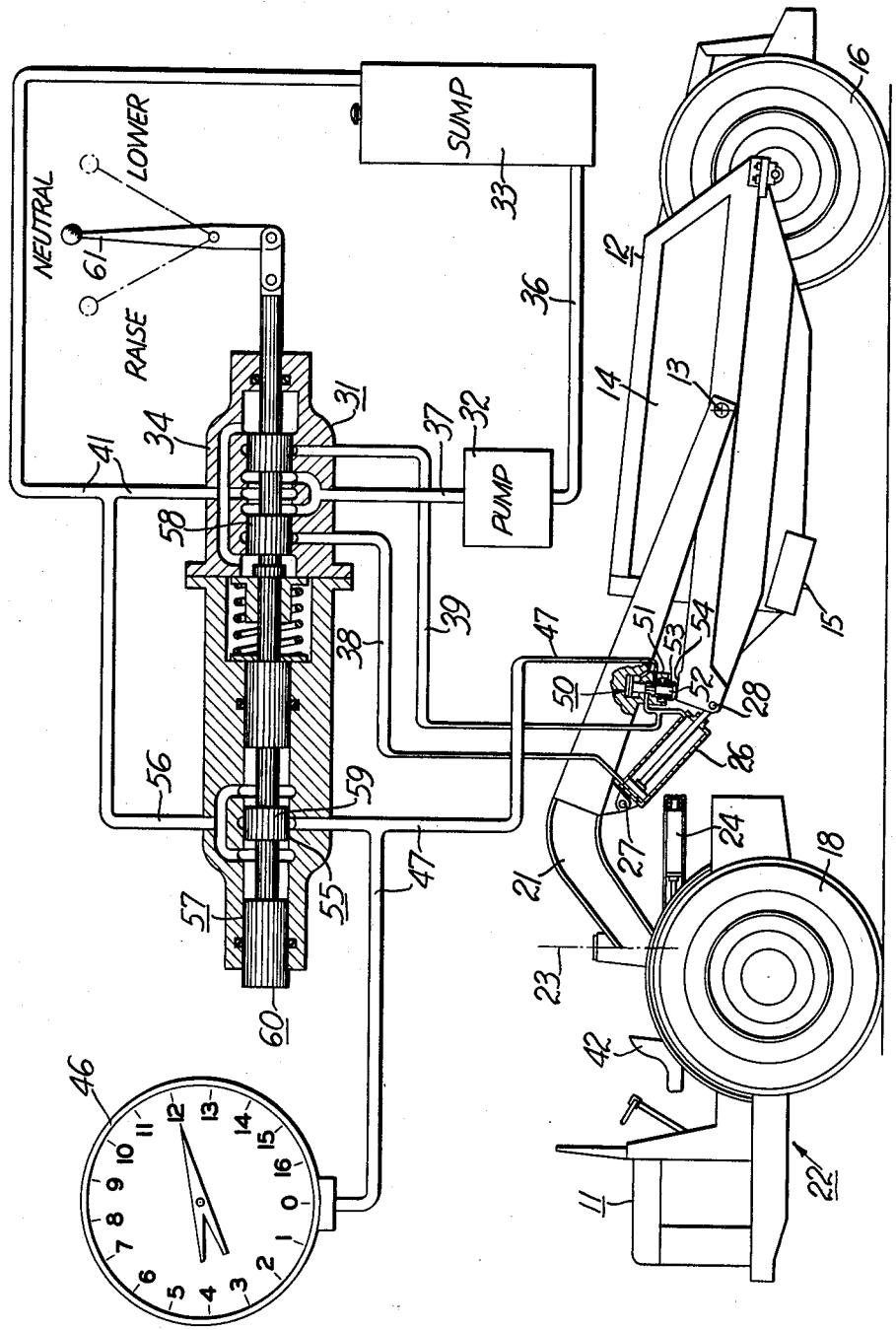
Inventor
Harvey W. Rockwell
By Charles L. Schwab
Attorney

United States Patent Office 3,154,160
Patented Oct. 27, 1964

3,154,160
LOAD INDICATOR FOR MATERIAL HANDLING VEHICLE
Harvey W. Rockwell, Cedar Rapids, Iowa, assignor to Allis-Chalmers Manufacturing Company, Milwaukee, Wis.
Filed June 14, 1962, Ser. No. 202,599
8 Claims. (Cl. 177—141)

This invention relates to means for indicating to an operator the weight of a load carried by material handling vehicles and is particularly concerned with providing a load indicating mechanism which is responsive to the hydraulic pressure in a load carrying ram of the vehicle.

It is an object of this invention to provide a load indicating mechanism in a material handling vehicle of the type having front and rear wheeled units pivotally interconnected on a transverse axis and having at least one hydraulic load supporting ram interconnected between the front and rear units, and wherein the load indicating mechanism is responsive to the pressure of the fluid on the load carrying side of the ram.

It is a further object of this invention to provide a load indicating mechanism of the type hereinbefore described wherein the load indicating device is not operative when the front and rear units are pivoted out of their raised position.

It is a further object of this invention to provide a load indicating mechanism of the type hereinbefore described wherein the load indicating device is operative only when the control valve for the load carrying ram is in its neutral position in which fluid is blocked in the ram.

It is a further object of this invention to provide a load indicating mechanism for a material handling vehicle which is responsive to the pressure in a load carrying ram and wherein the indicator is operative to indicate the load carried by the vehicle only when conditions are such that the pressure on the load carrying side of the ram causes the indicator to accurately indicate the load carried by the vehicle.

It is a further object of this invention to provide a load indicating mechanism in a tractor scraper of the type having front and rear units pivotally connected on a transverse axis and wherein the hydraulic ram is interposed between the two units to raise and lower the units by pivotal movement about the axis and wherein the indicator is responsive to the pressure in the load carrying ram only when the units have been raised by the ram to their transport raised position and the valve controlling the ram is in a neutral or hold position.

It is a further object of this invention to provide an improved load indicating mechanism for a load carrying vehicle which is operative only when it accurately indicates the load being transported.

These and other objects and advantages of this invention will be apparent from the following description when read in conjunction with the drawing showing the present invention incorporated in a four wheel tractor scraper.

Referring to the drawing, a front two wheel tractor unit 11 and the rear two wheeled scraper unit 12 are pivotally interconnected on a transverse axis 13 for relative vertical swinging movement. The scraper unit includes a bow 14 with a cutting edge 15 and a pair of wheels 16, only one of which is shown. The tractor unit 11 includes a two wheel tractor 22 having a pair of wheels 18, only one of which is shown, for propelling the tractor scraper, through their being driven by an internal combustion engine and transmission, not shown. The tractor unit 11 also includes a yoke 21 connected to the two wheel tractor 22 for steering movement about an axis 23 by steering means 24.

Hydraulic power means in the form of a hydraulic ram 26 is provided to pivot the units 11 and 12 about axis 13 between a lowered position, in which the cutting blade 15 may be employed to excavate or load material, to a raised or transport position in which illustrated. The ram 26 is pivotally connected at its upper end to the yoke 21 of the front unit 11 by a pin 27 and the piston rod of the ram is pivotally connected at its lower end to the rear unit 12 by a pin 28. A hydraulic fluid supply and control means 31 is provided for operating the ram 26. These means 31 include a pump 32 drawing oil from sump 33, a control valve 34, a conduit 36 connecting the sump and pump, a conduit 37 between the pump 32 and the valve 34, a pair of pressure lines 38, 39 connecting valve 34 to ram 26 and a fluid return line 41. The control valve 34 is at the operator's station on the tractor 22 within reach of an operator occupying seat 42.

An indicator 46 is mounted on the dashboard of the two wheel tractor 22 for viewing by the operator and is calibrated to indicate the load carried in bowl 14. The dial of the indicator 46 may be calibrated to register the number of tons carried or it may be calibrated to indicate the weight in other units of weight measurement such as thousands of pounds. Hydraulic pressure responsive means are provided for causing the indicator 46 to indicate the load carried by the ram 26. In the illustrated embodiment of this invention, the weight of the pay load is reflected by the hydraulic pressure in the load carrying side of the hydraulic ram 26. The pressure responsive means for causing the indicator 46 to indicate the load carried includes a conduit or passage 47 interconnecting the indicator 46 and the load carrying or bottom side of the ram 26. The indicator is calibrated to show the weight of the pay load, as reflected in the pressure of the bottom side of ram 26, when the ram is contracted to the raised position of the units as illustrated. Since the line of force exerted by the ram varies with the pivoted condition of the front and rear units about axis 13, it is necessary to measure the weight of the transported load at the same ram disposition each time in order to get accurate weight indications. In order to prevent erroneous weight indications a disabling means in the form of a stop valve 50 is interposed in the conduit 47 between the indicator 46 and the ram 26. Thus the indicator will not be influenced by the pressure in ram 26 when the latter is not in its raised position. When the vehicle moves out of its raised or transport position, in which illustrated, the spool 52 of the stop valve 50 is moved downwardly relative to a housing portion 51 on yoke 21 by spring 53 to a cutoff position preventing fluid flow from the lower end of the ram through passage 47. Spool 52 is abutted by an abutment surface 54 on the scraper bowl 14 and moved upwardly to its open position when the ram is contracted to the raised position as shown.

Since accurate weight will not be indicated when the control valve is in a ram actuating position, an inactivating means 55 is provided to prevent the indicator from responding to fluid pressure in ram 26. The inactivating means 55 includes a bypass passage 56 between return line 41 and passage 47 and a dumping valve 57, spool 60 of which is an extension of valve spool 58 of control valve 34. When the control valve spool 58 is shifted, by movement of hand lever 61, to either the raised or lowered position, the land 59 of spool 60 will uncover passage 56 permitting dumping of fluid from passage 47 to return line 41. Thus when the control valve 34 is in a ram actuating position, the dumping valve 57 is in a dumping position.

From the drawings and foregoing description it is seen that a load indicating mechanism has been provided which permits the vehicle operator to accurately ascertain the weight of the pay load being carried by the vehicle. The dumping circuit, referred to as inactivating means, not only prevents a false reading during actuation of the ram 26, but also guards the indicator against possible overload damage.

Although a single embodiment of this invention has been illustrated and described it is not intended to so limit this invention.

What is claimed is:

1. A load indicating mechanism for a material handling vehicle of the type having front and rear wheeled units pivotally interconnected on a transverse axis and at least one hydraulic ram between said units for causing relative pivoting of the latter about said axis between raised and lowered positions, said mechanism comprising: hydraulic fluid supply and control means for said ram including a valve movable from a neutral position, in which fluid is blocked in said ram, to raise and lower positions, means for indicating the weight of the material being transported in said vehicle including an indicator responsive to the pressure in the load supporting end of said ram, means preventing said indicator from being operative to indicate the weight of material carried by said vehicle when said units are pivoted out of their raised position, and means preventing said indicator from being operative to indicate the weight of material carried by said vehicle when said valve is moved out of its neutral position.

2. A load indicating mechanism for a material handling vehicle of the type having front and rear wheeled units pivotally interconnected on a transverse axis and at least one hydraulic ram between said units for causing relative pivoting of the latter about said axis between raised and lowered positions, said mechanism comprising: means for indicating the weight of the material being transported in said vehicle including an indicator responsive to the pressure in the load supporting end of said ram, and means preventing said indicator from being operative to indicate the weight of material carried by said vehicle when said units are pivoted out of their raised position including a stop valve carried by one of said units and movable by the other of said units from an open position to a cutoff position, when said units are moved to their raised position, in which the pressure in the load carrying end of said ram acts upon said indicator.

3. A load indicating mechanism for a tractor scraper of the type having front and rear wheeled units pivotally interconnected on a transverse axis and at least one hydraulic ram between said units for causing relative pivoting of the latter about said axis between raised and lowered positions, said mechanism comprising: hydraulic fluid supply and control means for said ram including a manually operable control valve movable from a neutral position, in which fluid is blocked in said ram, to raise and lower positions in which said ram raises and lowers said units, respectively, means for indicating the weight of the material being transported in said scraper including a fluid pressure responsive indicator and a fluid passage connecting said indicator and the load supporting end of said ram, disabling means preventing said indicator from responding to the fluid pressure in the load supporting end of said ram when said units are pivoted out of their raised position, and inactivating means preventing said indicator from being responsive to the fluid pressure in the load supporting end of said ram when said control valve is moved out of its neutral position.

4. The structure set forth in claim 3 wherein said disabling means includes a stop valve carried by one of said units and movable by the other of said units, when said units are moved to their raised position, to an open position in which fluid flow in said passage is permitted, and wherein said inactivating means includes a bypass passage connected to said fluid passage and a dumping valve in said bypass passage responsive to movement of said control valve, said dumping valve being moved to a fluid blocking position when said control valve is in its neutral position and to a dumping position when said control valve is moved out of its neutral position.

5. A load indicating mechanism for a tractor scraper of the type having front and rear wheeled units pivotally interconnected on a transverse axis and at least one hydraulic ram between said units for causing relative pivoting of the latter about said axis between raised and lowered positions, said mechanism comprising: hydraulic fluid supply and control means for said ram including a manually operable control valve movable from a neutral position, in which fluid is blocked in said ram, to raise and lower positions in which said ram raises and lowers said units, respectively, means for indicating the weight of the material being transported in said scraper including a fluid pressure responsive indicator and a fluid passage connecting said indicator and the load supporting end of said ram, and disabling means preventing said indicator from responding to the fluid pressure in the load supporting end of said ram when said units are pivoted out of their raised position.

6. The structure set forth in claim 5 wherein said disabling means includes a stop valve carried by one of said units and movable by the other of said units from an open position to a cutoff position, when said units are moved out of their raised position, in which fluid flow in said passage is blocked.

7. A load indicating mechanism for a tractor scraper of the type having front and rear wheeled units pivotally interconnected on a transverse axis and at least one hydraulic ram between said units for causing relative pivoting of the latter about said axis between raised and lowered positions, said mechanism comprising: hydraulic fluid supply and control means for said ram including a manually operable control valve movable from a neutral position, in which fluid is blocked in said ram, to raise and lower positions in which said ram raises and lowers said units, respectively, means for indicating the weight of the material being transported in said scraper including a fluid pressure responsive indicator and a fluid passage connecting said indicator and the load supporting end of said ram, and inactivating means preventing said indicator from being responsive to the fluid pressure in the load supporting end of said ram when said control valve is moved out of its neutral position.

8. The structure set forth in claim 7 wherein said inactivating means includes a bypass passage connected to said fluid passage and a dumping valve in said dumping passage responsive to movement of said control valve, said dumping valve being moved to a fluid blocking position when said control valve is in its neutral position and to a fluid position when said control valve is moved out of its neutral position.

References Cited in the file of this patent

UNITED STATES PATENTS

| | | |
|---|---|---|
| 3,035,650 | Friedl | May 22, 1962 |
| 3,036,663 | Burka | May 29, 1962 |
| 3,039,211 | Rezabek | June 19, 1962 |
| 3,042,376 | Miller | July 3, 1962 |
| 3,061,117 | Kruse | Oct. 30, 1962 |